United States Patent [19]

Sach et al.

[11] Patent Number: 5,398,045
[45] Date of Patent: Mar. 14, 1995

[54] TOUCH CONTROL PANEL

[75] Inventors: Gary M. Sach, Villa Park; Bruce K. Bromage, Anaheim Hills; Don F. Purpura, Yorba Linda, all of Calif.

[73] Assignee: Hughes Aircraft Company, Los Angeles, Calif.

[21] Appl. No.: 573,101

[22] Filed: Aug. 24, 1990

[51] Int. Cl.$^6$ .......................... G09G 5/00; G06F 3/02
[52] U.S. Cl. ..................................... 345/172; 340/945
[58] Field of Search ........... 340/706, 711, 712, 825.19, 340/945; 178/18, 19; 345/146, 172, 169; 341/21

[56] References Cited

U.S. PATENT DOCUMENTS

| | | | |
|---|---|---|---|
| 4,185,281 | 1/1980 | Silverstone . | |
| 4,310,839 | 1/1982 | Schwedt | 340/712 |
| 4,332,464 | 6/1982 | Bartulis et al. | 340/712 |
| 4,476,463 | 10/1984 | Ng et al. | 340/712 |
| 4,550,221 | 10/1985 | Mabusth | 340/712 |
| 4,700,176 | 10/1987 | Adler | 340/712 |
| 4,707,845 | 11/1987 | Krein et al. | 340/706 |
| 4,812,833 | 3/1989 | Shimouchi | 178/18 |
| 4,825,209 | 4/1989 | Sasaki et al. | 358/194.1 |
| 4,914,624 | 4/1990 | Dunthorn | 340/712 |
| 4,922,061 | 5/1990 | Meadows et al. | 340/706 |
| 4,937,762 | 6/1990 | Todome | 340/712 |
| 5,053,758 | 10/1991 | Cornett et al. | 340/712 |

Primary Examiner—Jeffery Brier
Attorney, Agent, or Firm—W. K. Denson-Low

[57] ABSTRACT

A touch control panel for a cathode ray tube display system that provides for a command entry device. The control panel comprise a touch sensitive panel adapted to produce different output signals depending upon where it is contacted. A processor is coupled to the panel for processing the output signals to select and then display a particular pop-up menu from a plurality of stored menus. An activation switch is provided to select the currently highlighted menu as selected via the touch sensitive panel.

12 Claims, 1 Drawing Sheet

TOUCH CONTROL PANEL

BACKGROUND

The present invention is generally related cathode ray tube display control systems and more particularly to an improved man/machine interface and command entry device employed in such systems.

In many complex systems, such as a shipboard combat control system, wherein it may necessary to quickly select, actuate and then control a variety of offensive, defensive and operational subsystems under combat or other extreme conditions, one method of subsystem control is effected by creating a plurality of menus that are displayed on a cathode ray tube. Each of the menus displays the functional characteristics of a selected one of the subsystems, and the menus are stored in the memory of an associated computer. The menus are selectively called up and displayed on an output device, such as one or more cathode ray tubes. From the range of options displayed, an operator can then select one or more of these to enable and operate the selected subsystem in the manner defined by the menu option chosen. In many commercial computer systems, such functional selection is often done with a "mouse," but in many military applications, particularly in ships where violent pitch, yaw and roll motions can occur and in high performance aircraft, where such motions are compounded with cramped working spaces, the use of a mouse is often not practical.

In response to these problems, one current design for a subsystem/function selection system comprises a plurality of menu selection switches that are mounted in one or more rows along side of a cathode ray tube display. The system operator depresses one of the switches to first select and display the menu for a particular subsystem to be controlled and then depresses one or more other switches to select the function or functions to be performed from those displayed with the menu. This approach has two problems; one, it cannot be implemented in those situations that require the operator to be at more than arms distance from the display and the selector switches associated therewith; and second, particularly in horizontal summary displays, the operator often has to reach across the display to activate a particular switch and thus partially interfere with his view of the display, and the view of any others.

Accordingly, it is an objective of the present invention to provide a command entry device that eliminates the actuation problems associated with the mechanical switch system, while providing ease of use such as is provided by a mouse device.

SUMMARY OF THE INVENTION

The present invention comprises a cathode ray tube display, a mechanically actuated entry switch coupled to the display, and a touch sensitive panel operatively coupled to the switch. The panel is adapted to facilitate the selection, display and high-lighting of one of a series of internally stored pop-up menus on the cathode ray tube display. The particular menu selected for display depends upon where the touch sensitive panel is contacted, by means of the operator's finger, for example, when the entry switch is actuated. To select an operating function, the operator merely moves his finger, for example, around the surface of the panel, so that a menu selection corresponding to the position of the finger on the surface of the panel is highlighted. The selection of any particular operating function is then entered by depressing the mechanically actuated entry switch when the desired function is highlighted, by means of the operator's thumb, for example.

BRIEF DESCRIPTION OF THE DRAWINGS

The various features and advantages of the present invention may be more readily understood with reference to the following detailed description taken in conjunction with the accompanying drawings in which.

DETAILED DESCRIPTION

Figure 1:
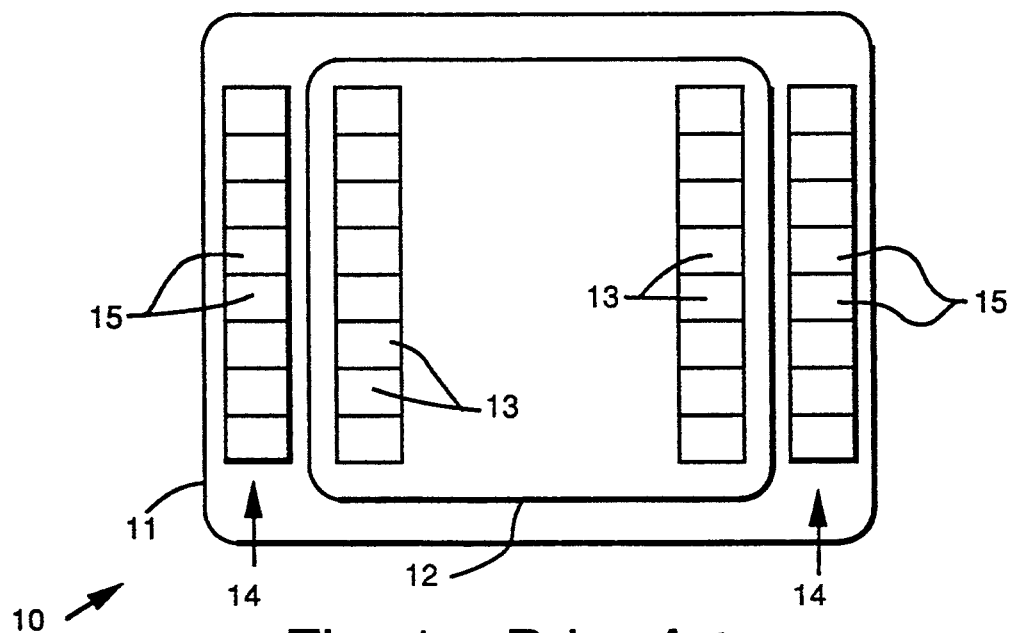
FIG. 1 is a plan view of a prior an display selection system.

FIG. 1 shows a typical prior an menu subsystem/function selection system 10 which comprises a cathode ray tube display 11, including a cathode ray tube 12 on which pop-up menus 13 and other visual information are presented and displayed, and at least one row 14 comprising a plurality of selector switches 15. The operation of the selection system 10 comprises first depressing or otherwise actuating one of the selector switches 15 to cause a selected one of a plurality of the subsystem pop-up menus 13 to appear on the cathode ray tube 12, and then actuating one or more of the selector switches 15 to select a particular function that is to be performed.

Illustratively, on a naval vessel, for example, the individual subsystem pop-up menus might represent particular offensive or defensive weapons systems and the function selections might be instructions such as those to activate tracking radars, fire off chaff rounds to confuse incoming missiles, fire a major weapons system, and the like. Other illustrations include activating one or more damage control subsystems or various engineering subsystems and functions concerned with the overall operation of the ship. Similar needs and operations also occur in high performance military aircraft, manned space vehicles, and in complex air control systems at many airports handling large numbers of commercial and/or military aircraft.

This approach has two problems. Firstly, it cannot be implemented in those situations that require the operator to be at more than arms distance from the display and the selector switches associated therewith. Secondly, particularly when a horizontal summary display is used, the operator often has to reach across the display to activate a particular switch and thus partially interfere with his view of the display, and the view of other personnel.

Figure 2:
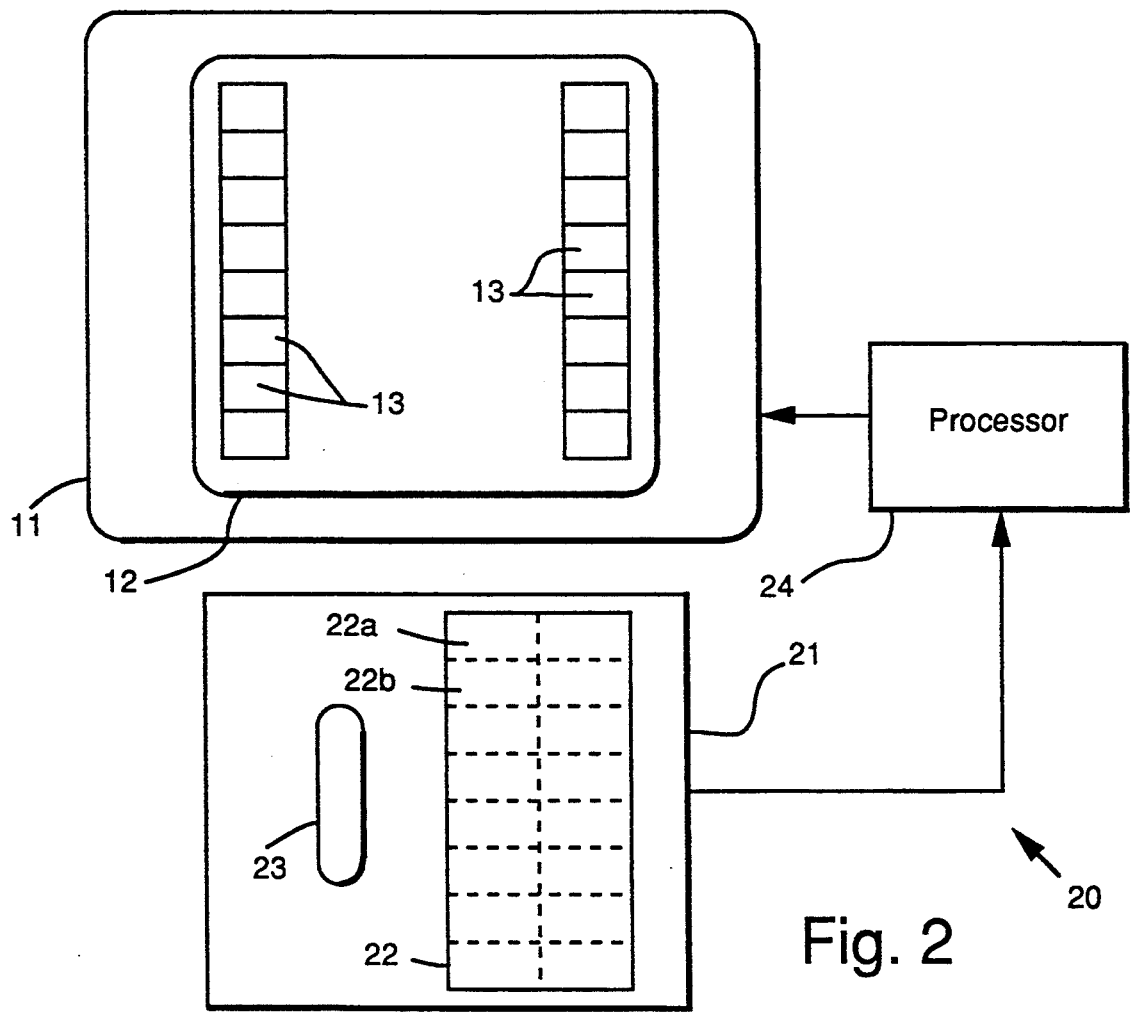
FIG. 2 is a plan view of the display selection system in accordance with the principles of the present invention.

Accordingly, and with reference to FIG. 2, the operation of the conventional menu subsystem/function selection system 10 is simplified by employing a selection system 20 in accordance with the principles of the present invention. In the selection system 20 the selector switches 15 are replaced with a touch sensitive control device 21, which is preferably located as close to the operator as is ergonomically desirable. The touch sensitive control device 21 includes a touch sensitive panel 22 that is constructed such that when a plurality of touch sensitive areas 22a, 22b, etc. are actuated by a change in the local resistance, AC impedance, capacitance, pressure, acoustic, temperature, or any other localized effect or characteristic that is caused by the placement of an operator's finger, for example, at a particular position thereupon.

In response to the placement of the operator's finger on the touch sensitive areas 22a, 22b, etc., a voltage (or current) output signal is generated, with a magnitude, frequency, phase or other measurable characteristic which is a function of the particular position of the finger on the touch sensitive panel 21. These signals, are transmitted to a processor 24, which may be a dedicated computer or similar data storage subsystem, and are interpreted therein which results in the selection of one of a plurality of subsystem menus 13 as hereinabove described. The selected menu is then displayed and/or highlighted on the cathode ray tube 12.

Since moving the finger around on the panel 21 causes different subsystem menus 13 to highlight in response to the changing signals, a selector switch 23 is provided as a means to activate the subsystem menu on the cathode ray tube display 11, whenever it is actuated. Once this activation occurs, the operator's finger can then be removed from the panel 21 and the menu disappears. In the embodiment shown in FIG. 2, such actuation is most easily and quickly accomplished when the selector switch 23 is a pressure sensitive switch that is actuated by depressing it with the operator's thumb at the appropriate time, although other means of so doing are equally acceptable.

Subsequent selection of a particular function that is to be displayed and/or performed is accomplished in the same manner, in that the operator places his finger on the touch sensitive areas 22a, 22b, etc., of the touch sensitive panel 21, and the selected function corresponds to the relative position of the finger within the panel area that is highlighted. At this point, the operator may do one of three things: (1) select the highlighted functional option by actuating the mechanical selector switch 23, (2) move his (or her) finger within the panel touch area to highlight a different functional option, or (3) lift his (or her) finger from the touch panel 21 to remove the pop-up menus 13 from the display 11 and either repeat or abort the selection process.

At the conclusion of the operation of the selected function, the system 20 is unlocked and reset for a second, or subsequent operation by depressing or otherwise actuating the selector switch 23 a second time. Consequently, the subsystem and/or function selection process is then repeated as described above.

In use, the touch control panel 21 of the present invention offers the advantage of an improved simplified man/machine interface in complex systems where it is necessary for a human operator to quickly and accurately select a particular operating subsystem and function therefrom. It is also an advantage when the function selection must be made from a range of options presented as one particular menu of options which is, in turn, selected from a plurality of internally stored menus. Such use allows the system operator to increase both the speed and accuracy of selections since the present system 20 requires minimal hand movement and provides immediate feedback. The present system 20 also allows the operator to give his (or her) undivided attention to information provided on the display 11.

Thus there has been described a new and improved touch control panel and command entry device for use with a display system. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A touch control panel for use with a cathode ray tube display, said touch control panel comprising:
    a touch sensitive panel for generating a plurality of output signals as a function of where the touch sensitive panel is contacted with a finger;
    processing means coupled between the touch sensitive panel and the cathode ray tube display for receiving and processing the plurality of output signals to select a predefined pop-up menu from a plurality of menus stored therein and for displaying and highlighting the predefined menu on the cathode ray tube display; and
    activation means disposed adjacent the touch sensitive panel and coupled to the processing means for activating the highlighted pop-up menu selected by means of the touch sensitive panel.

2. The touch control panel of claim 1, wherein the panel comprises means for producing the output signals as a function of a localized change in capacitance.

3. The touch control panel of claim 1, wherein the panel comprises means for producing the output signals as a function of a localized change in an acoustic characteristic.

4. The touch control panel of claim 1, wherein the panel comprises means for producing the output signals as a function of a localized change in resistance.

5. The touch control panel of claim 1, wherein the panel comprises means for producing the output signals as a function of a localized change in AC impedance.

6. The touch control panel of claim 1 wherein the activation means is a pressure sensitive switch, which when depressed, is first actuated to produce a signal locking the displayed menu on the cathode ray tube display, is then actuated to produce a signal actuating a function selected from the menu, and is then actuated to reset the system after the selected function has been displayed.

7. A touch control panel for use with a cathode ray tube display, said touch control panel comprising:
    a touch sensitive panel for generating a plurality of output signals as a function of where the touch sensitive panel is contacted;
    processing means coupled between the touch sensitive panel and the cathode ray tube display for receiving and processing the plurality of output signals to select a predefined pop-up menu from a plurality of menus stored therein and for displaying and highlighting the predefined menu on the cathode ray tube display; and
    activation means disposed adjacent the touch sensitive panel and coupled to the processing means for activating the highlighted pop-up menu selected by means of the touch sensitive panel, said activation means comprising a pressure sensitive switch, which when depressed, is first actuated to produce a signal locking the displayed menu on the cathode ray tube display, is then actuated to produce a signal actuating a function selected from the menu, and is then actuated to reset the system after the selected function has been displayed.

8. The touch control panel of claim 7, wherein the panel comprises means for producing the output signals as a function of a localized change in capacitance.

9. The touch control panel of claim 7, wherein the panel comprises means for producing the output signals as a function of a localized change in an acoustic characteristic.

10. The touch control panel of claim 7, wherein the panel comprises means for producing the output signals as a function of a localized change in resistance.

11. The touch control panel of claim 7, wherein the panel comprises means for producing the output signals as a function of a localized change in AC impedance.

12. A touch control panel for use with a cathode ray tube display, said touch control panel comprising:

a touch sensitive panel for generating a plurality of output signals as a function of where the touch sensitive panel is contacted;

processing means coupled between the touch sensitive panel and the cathode ray tube display for receiving and processing the plurality of output signals to select a predefined pop-up menu from a plurality of menus stored therein and for displaying and highlighting the predefined menu on the cathode ray tube display; and activation means disposed adjacent the touch sensitive panel and coupled to the processing means for activating the highlighted pop-up menu selected by means of the touch sensitive panel.

* * * * *